(12) United States Patent
Xiao

(10) Patent No.: US 9,965,404 B2
(45) Date of Patent: May 8, 2018

(54) FULL-CONTROL REMOTE CONTROLLER BASED ON WAVEFORM DOWNLOADING AND ADDRESS SELECTING AND AN IMPLEMENTING METHOD THEREOF

(71) Applicant: Foshan Bolang De Technology Co., Ltd., Foshan (CN)

(72) Inventor: Zhengwen Xiao, Foshan (CN)

(73) Assignee: FOSHAN BOLANG DE TECHNOLOGY CO., LTD., Foshan (CN)

( * ) Notice: Subject to any disclaimer, the term of this patent is extended or adjusted under 35 U.S.C. 154(b) by 175 days.

(21) Appl. No.: 15/063,687

(22) Filed: Mar. 8, 2016

(65) Prior Publication Data

US 2016/0328336 A1 Nov. 10, 2016

(30) Foreign Application Priority Data

May 5, 2015 (CN) .......................... 2015 1 0222929

(51) Int. Cl.
| | |
|---|---|
| *G06F 13/10* | (2006.01) |
| *G06F 13/42* | (2006.01) |
| *G06F 1/26* | (2006.01) |
| *G06F 12/02* | (2006.01) |

(52) U.S. Cl.
CPC ............ *G06F 13/102* (2013.01); *G06F 1/263* (2013.01); *G06F 12/0246* (2013.01); *G06F 13/4282* (2013.01); *G06F 2212/2022* (2013.01)

(58) Field of Classification Search
None
See application file for complete search history.

(56) References Cited

U.S. PATENT DOCUMENTS

| | | | | |
|---|---|---|---|---|
| 6,779,004 | B1* | 8/2004 | Zintel | H04L 12/2803 709/227 |
| 2005/0052423 | A1* | 3/2005 | Harris | G08C 17/02 345/169 |
| 2007/0139225 | A1* | 6/2007 | Lee | G06F 1/1626 341/22 |
| 2012/0295662 | A1* | 11/2012 | Haubrich | H04M 1/72533 455/556.1 |

* cited by examiner

*Primary Examiner* — Idriss N Alrobaye
*Assistant Examiner* — Dayton Lewis-Taylor
(74) *Attorney, Agent, or Firm* — Rahman LLC

(57) ABSTRACT

The invention relates to a full-control remote controller based on waveform downloading and address selecting and an implementing method thereof. The controller according to the invention comprises a single-chip system and a rechargeable battery with a USB port, wherein the single-chip system is provided with a remote control operation interface, an upper computer interface, a FLASH memory, a CPU and an infrared transmitting and receiving circuit. The controller has the functions of learning, downloading and remote control, comprises a communication module, a key processing module and an infrared data receiving and transmitting module, and can be integrated for remotely controlling various appliances. The controller solves the battery problem of the conventional remote controllers, and thus provides great convenience in use. As the remote control data files are shared by modern network technologies, in particular by the Internet technologies, the remote controller can be personally customized.

4 Claims, 4 Drawing Sheets

FULL-CONTROL REMOTE CONTROLLER BASED ON WAVEFORM DOWNLOADING AND ADDRESS SELECTING AND AN IMPLEMENTING METHOD THEREOF

CROSS-REFERENCE TO RELATED APPLICATIONS

This application claims the priority, under 35 U.S.C. § 119, of Chinese patent application number 201510222929.3 filed on May 5, 2015, which is incorporated by reference herein in its entirety.

FIELD OF THE INVENTION

The present invention pertains to the application field of electronic technology, and more particularly, relates to a full-control remote controller based on waveform downloading and address selecting and an implementing method thereof.

BACKGROUND

Remote controllers are widely used along with electronic appliance products. Taking household appliances for example, in each household various types of remote control appliances which are from different manufacturers are used. Various types and manufacturers cause each household to have various types of remote controllers, which brings disarray and inexpedience in use.

A problem that people complain about all the time is about the batteries of the remote controllers: (1) the batteries have a relatively short service life and a variety of types, their replacement may be a trouble; and (2) as usually there is no prompt when a battery runs out of power, and the battery cannot be replaced in time, a resulting battery leakage may erode and damage the remote controller.

In view of these problems, some professional remote controller manufacturers have launched some universal remote controllers. These universal remote controllers usually have a learning function and a coding design, which basically solve the replacement related problems of the remote controllers, and thus are suitable for a single remote controller application.

However, these universal remote controllers encounter a bottleneck under the circumstances where one controller serves for more than one appliance. Due to the inconsistence in coding among the remote controllers from different manufacturers, a user has to recode the universal remote controller for different appliances, which increases the difficulty for users. In addition, the code input by keys is complicated and inconvenient.

Technically speaking, the universal remote controllers usually employ a remote control IC solution, in which the waveform data is integrated in its IC memory (firmware), falling under a static storage solution. Although thousands of sets of remote control waveform data are statically stored, but the number of the universal remote controllers actually used by each household is rather small, this forms a typical micro application of mass data resources. What is more important is that new remote control appliances are continuously launched, many of which employ new remote control waveforms. It is very difficult for a universal remote controller based on static storage in use to match with the fully dynamic characteristics of increasing numbers and changing waveforms of the new remote controllers.

Furthermore, a universal remote controller uses dynamic storage in its learning function, and stores the learned remote control waveform data in its internal memory, which is only used by the universal remote controller per se. The data is not stored in an external memory as a file for share with other universal remote controllers, so that the resources are wasted. The universal remote controller itself does not use the waveform data resources learned from other universal remote controllers either.

SUMMARY

To solve the above-mentioned defects of the existing art, the present invention specially provides a full-control remote controller based on waveform downloading and address selecting and an implementing method thereof, which not only solves the problems of the prior art, but also has a plurality of other beneficial effects.

The full-control remote controller based on waveform downloading and address selecting according to the invention comprises a single-chip system, provided with a remote control operation interface, an upper computer interface, a FLASH memory, a CPU and an infrared transmitting and receiving circuit; and a battery, supplying power energy to the single-chip system, which is a rechargeable battery and connected to a charging source through a USB port.

The remote control operation interface is a keyboard or a touch screen, adapted to the CPU and FLASH memory and displaying names of different remote controllers, the number of remote control keys and the number of key codes.

The upper computer interface is connected to an upper computer running under Windows, Linux or IOS operating system through a USB port. The USB port may be shared or separately used for charging and signal transmission, in a way similar to the USB port charging manner for a smart phone or a tablet. Preferably the rechargeable battery 26 is a lithium battery.

Corresponding to the hardware configuration described above, the implementing method according to the invention comprises the following steps: (1) downloading controller-specified remote waveform data from an upper computer through a USB port into a FLASH memory; (2) generating remote control waveform data by a CPU through a learning function, transmitting the data generated to the upper computer to store it in a form of files for use of the full-control remote controller and others; (3) storing the remote control waveform data generated through learning on a local network or the Internet for resource sharing of the remote control waveform data; and (4) assigning address numbers to the remote control waveform data generated by learning, storing the data sequentially during downloading, selecting the address numbers during remote control operation to call out the remote control waveform data from corresponding memory areas, and hardware processing the remote control waveform data and outputting it from an infrared light emitting diode so as to achieve a remote control function for remotely controlling an appliance corresponding to an address number.

The CPU in the aforementioned hardware configuration comprises an upper computer software module and a single-chip software module, the upper computer software module comprises a learning functional module, a downloading functional module and a remote control functional module, and the single-chip software module comprises a communication module, a key processing module and an infrared data receiving and transmitting module.

The studying functional module and the downloading functional module function online with a connection to the upper computer through the USB port, and the remote control functional module may either function online or offline.

The function of the studying functional module is achieved by a user carrying out the following steps: connecting the full-control remote controller to the upper computer; running remote controller software on the upper computer to open the USB port for communication; setting a remote controller name, the number of remote control keys, and the number of key codes; aligning a remote controller to be learned with the infrared light receiving diode of the full-control remote controller; pressing keys for learning, wherein each time when a key of the remote control is pressed, the upper computer receives data and displays waveform, and a data storage key is then required to be pressed to complete data storing for the key of the remote control; after all the keys of the remote control are completely operated, pressing a file storage key to store the remote control waveform data gained by learning in a magnetic disk of the upper computer; and wherein one remote control file corresponds to one remote controller.

The present invention has the beneficial effects that: the problem of excessive remote controllers is solved, as one full-control remote controller may control all remote control appliances (for example, household appliances); the battery problem of conventional remote controllers is solved, as the conventional dry battery is substituted by the rechargeable battery; the use of USB charging, as of mobile phones and tablets, provides conveniences for users in use; and as the remote control data files are shared by modern network technologies, and particularly by internet technologies, the remote controller can be customized personally, and thus complied with the concept of the fourth-generation industrial design technology.

Due to the foregoing beneficial effects, the present invention is widely applicable to the new-generation full-control remote controllers.

BRIEF DESCRIPTION OF THE DRAWINGS

The present invention will be further described in details hereinafter with reference to the drawings, wherein.

DETAILED DESCRIPTION

Figure 1:
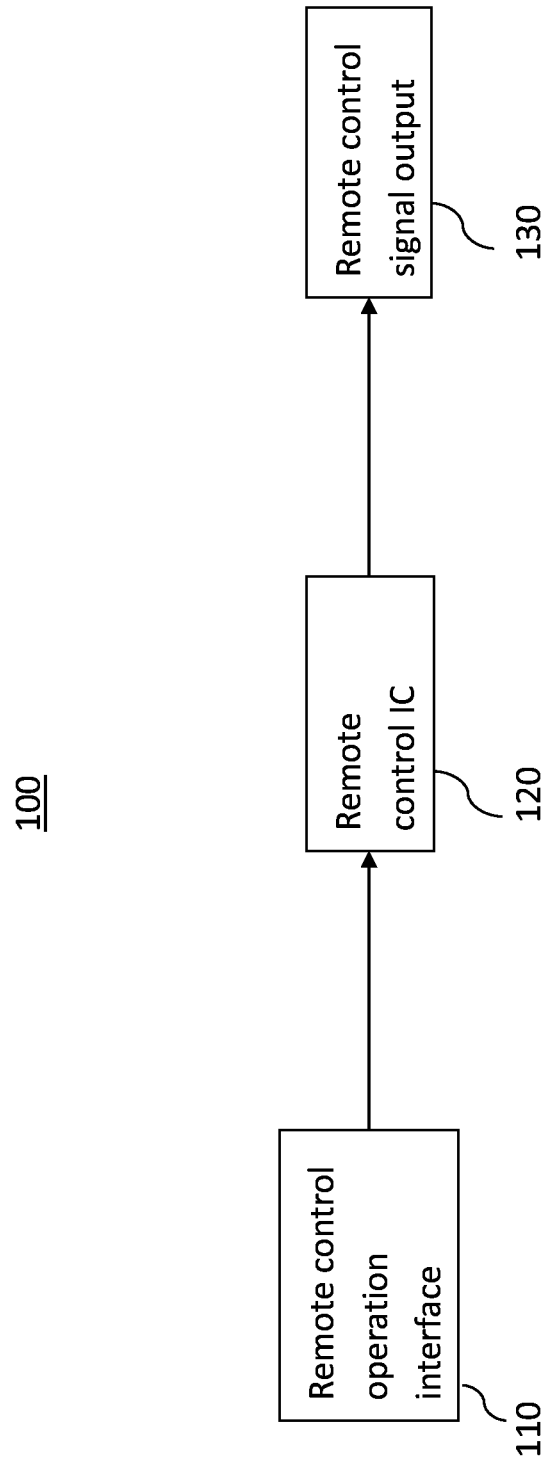
FIG. 1 is a schematic diagram of the present invention.
Figure 2:
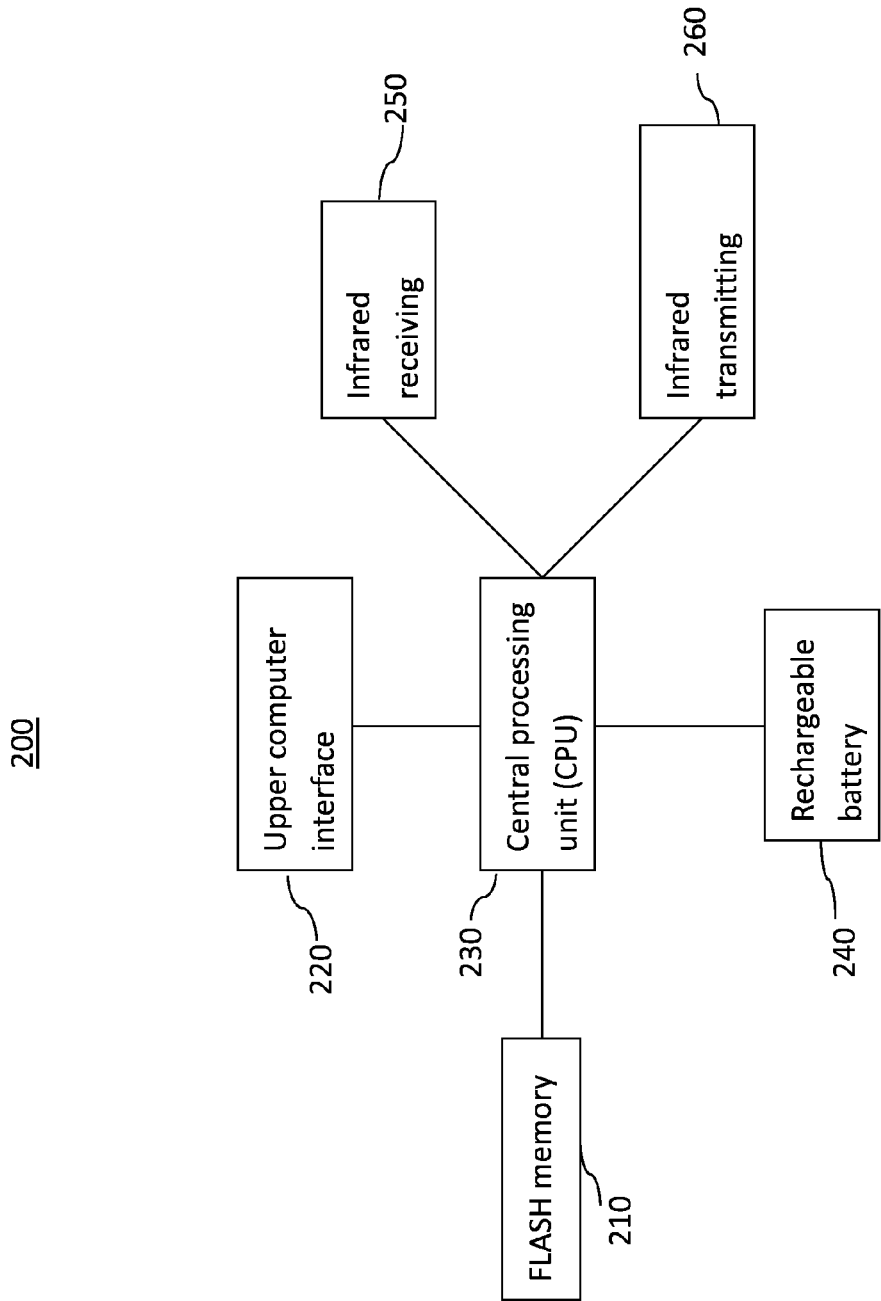
FIG. 2 is a functional block diagram of a controller according to the present invention.

Referring to FIGS. 1 and 2, a full-control remote controller based on waveform downloading and address selecting is illustrated, which comprises a single-chip system and a battery 240, wherein the battery supplies power energy to the single-chip system, and the single-chip system is provided with a remote control operation interface 110, an upper computer interface 220, a FLASH memory 210, a CPU 230 and an infrared transmitting and receiving circuit 260, 250. The battery 240 is a rechargeable battery, and connected to a charging source through a USB port. Preferably the rechargeable battery is a lithium battery.

The remote control operation interface 110 may be a keyboard or a touch screen, connected to the CPU 230 and the FLASH memory 210, displaying names of different remote controllers, the number of remote control key and the number of key codes. The upper computer interface 220 is connected to a personal computer running under Windows, Linux, or iOS operating systems through a USB port. The USB port may be shared or separately used for charging and signal transmission, in a way similar to the USB port charging manner for a smart phone or a tablet.

Figure 3:
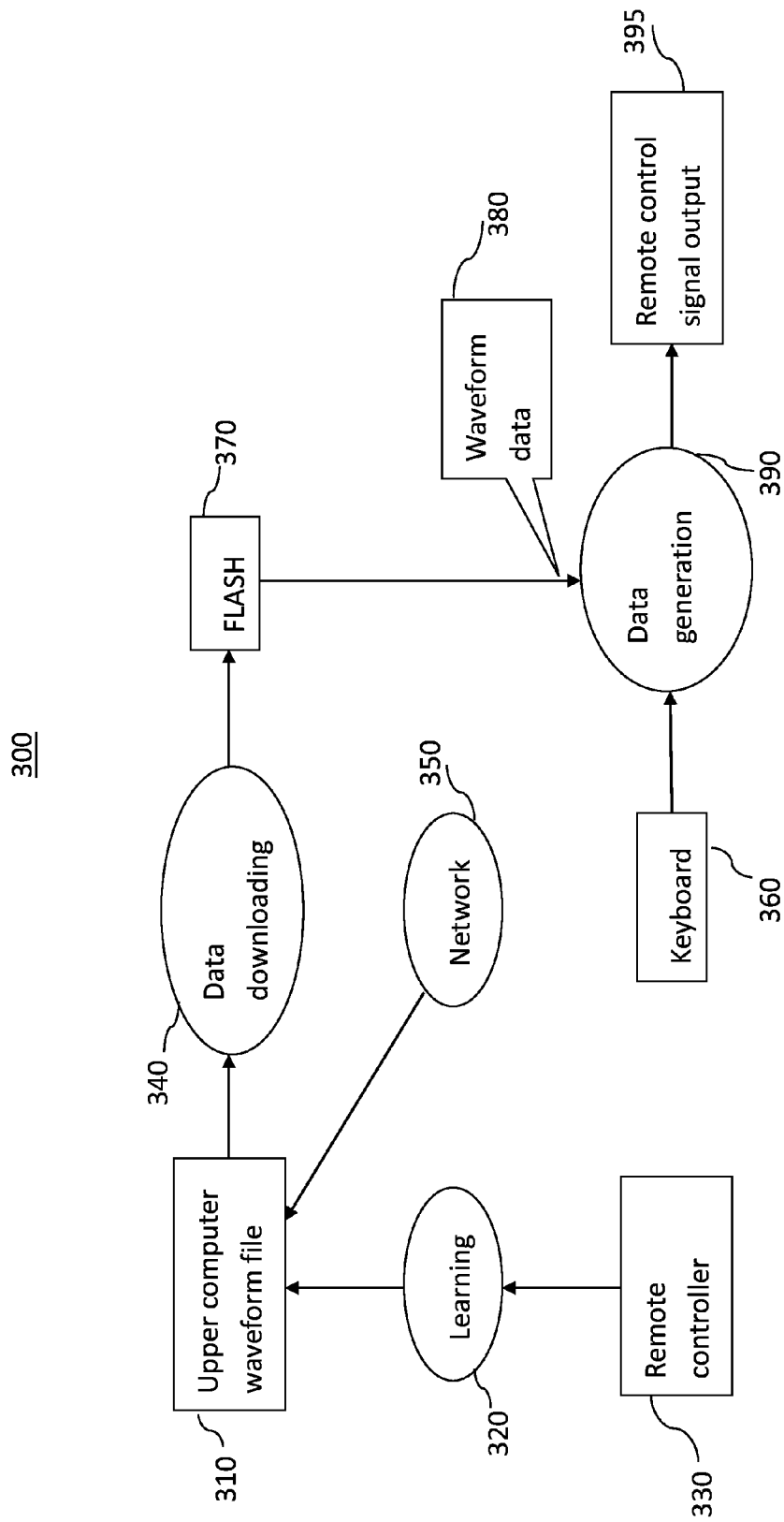
FIG. 3 is a flow diagram of an implementing method for the controller according to the present invention.
Figure 4:
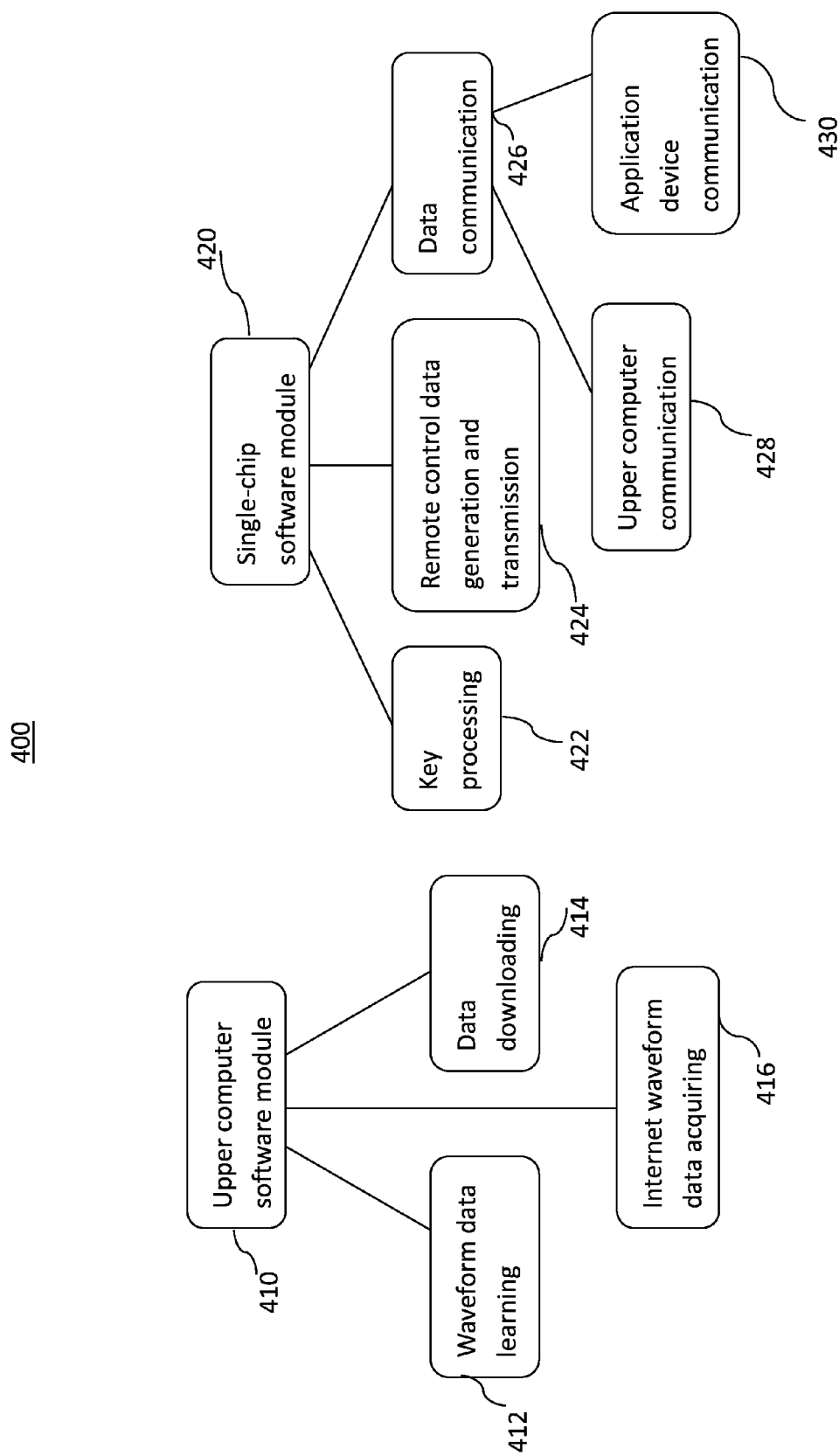
FIG. 4 is schematic diagrams of an upper computer software module and a single-chip software module according to the present invention.

Referring to FIGS. 3 and 4, an implementing method for full-control remote controller 330 based on waveform downloading and address selecting comprises: (1) downloading controller-specified remote waveform data 340 from an upper computer 310 through a USB port into a FLASH memory 370; (2) generating remote control waveform data 380 by a CPU through a learning function, transmitting the data generated by learning 390 to the upper computer and storing it in a form of files for use of the full-control remote controller 330 and/or others; (3) storing the remote control waveform data 380 generated through learning on a local network 350 or the Internet for resource sharing of the remote control waveform data 380; and (4) assigning address numbers to the remote control waveform data 380 generated by learning, storing the data sequentially during downloading, selecting the address numbers during remote control operation to call out the remote control waveform data 380 from corresponding memory areas, and hardware-processing the remote control waveform data 380 and outputting it 395 from an infrared light emitting diode so as to achieve a remote control function for remotely controlling an appliance corresponding to an address number.

The CPU in the aforementioned hardware configuration consists of an upper computer software module 410 and a single-chip software module 420, wherein the upper computer software module 410 is comprised of three functional modules: a learning functional module 412, a downloading functional module 414 and a remote control functional module, and the single-chip software module 420 is comprised of a communication module 426, a key processing module 422 and an infrared data receiving and transmitting module 424.

Said learning and downloading function modules function online, i.e. with a connection the upper computer through the USB port. The remote control function module may function either online or offline.

Said learning function is completed through the following steps: connecting a full-control remote controller 330 to the upper computer 410; running remote controller software on the upper computer 410 to open the USB port for communication; setting a remote controller name, the number of remote control keys and the number of key codes; and aligning a remote controller to be learned with an infrared light receiving diode of the full-control remote controller 330; pressing keys for leaning 320, wherein each time when a key of the remote control 330 is pressed, the upper computer 410 receives data and displays waveform, and then the user is required to press a data storage key to finish data storing for the key; after all the keys of the remote control are completely operated, pressing a file storage key to store the remote control waveform data 380 gained by learning 320 in a magnetic disk of the upper computer; and wherein each remote controller corresponds to one remote control file.

To achieve the above-mentioned complicated remote controller functions of the present invention, a keying table is defined, comprising the foregoing number of keys, number of key codes, starting address of waveform data memory and the like. Particularly, a part of the keys correspond to a plurality of remote control waveforms, for example, remote controllers for air conditioners and the like.

For those mobile phones and tablets equipped with an infrared light transmitting diode, it is easier to implement the present invention. By downloading the waveform data files from a local network or the Internet through USB or WIFI, it is even possible to write a remote control APP software for remote controlling an appliance.

Other Embodiments

It is to be understood that while the invention has been described in conjunction with the detailed description thereof, the foregoing description is intended to illustrate and not limit the scope of the invention, which is defined by the scope of the appended claims.

Other aspects, advantages, and modifications are within the scope of the following claims.

What is claimed is:

1. An implementing method for a full-control remote controller based on waveform downloading and address selecting, comprising:
   (a) downloading controller-specified remote waveform data from a upper computer through a USB port into a FLASH memory of the controller;
   (b) generating remote control waveform data by a CPU of the controller through a learning function, transmitting the data generated to the upper computer and storing it in a form of files for use of the full-control remote controller and/or others;
   (c) storing the remote control waveform data generated through learning on a local network or the Internet for resource sharing of the remote control waveform data; and
   (d) assigning address numbers to the remote control waveform data generated by learning, storing the data sequentially during downloading, selecting the address numbers during remote control operation to call out the remote control waveform data from corresponding memory areas of, and hardware-processing the remote control waveform data and outputting it from an infrared light emitting diode so as to achieve a remote control function for remotely controlling an appliance corresponding to an address number.

2. The implementing method for a full-control remote controller based on waveform downloading and address selecting of claim 1, wherein the CPU comprises an upper computer software module and a single-chip software module, the upper computer software module comprises a learning functional module, a downloading functional module and a remote control functional module, and the single-chip software module comprises a communication module, a key processing module and an infrared data receiving and transmitting module.

3. The implementing method for a full-control remote controller based on waveform downloading and address selecting of claim 2, wherein the studying functional module and the downloading functional module function online with a connection to the upper computer through the USB port, and the remote control functional module may either function online or offline.

4. The implementing method for a full-control remote controller based on waveform downloading and address selecting of claim 3, wherein the function of the studying functional module is achieved by the following steps: connecting the full-control remote controller to the upper computer; running remote controller software on the upper computer to open the USB port for communication; setting a remote controller name, the number of remote control keys, and the number of key codes; aligning a remote controller to be learned with the infrared light receiving diode of the full-control remote controller; pressing keys for learning, wherein each time when a key of the remote control is pressed, the upper computer receives data and displays waveform, and a data storage key is then required to be pressed to complete data storing for the key of the remote control; after all the keys of the remote control are completely operated, pressing a file storage key to store the remote control waveform data gained by learning in a magnetic disk of the upper computer; and wherein one remote control file corresponds to one remote controller.

* * * * *